(12) United States Patent
Krause et al.

(10) Patent No.: US 10,189,056 B1
(45) Date of Patent: Jan. 29, 2019

(54) SMART PHONE SCREEN CLEANING PAD

(71) Applicant: Scrub Daddy, Inc., Folcroft, PA (US)

(72) Inventors: Aaron C. Krause, Voorhees, NJ (US);
Aleksandrs Titovs, Folcroft, PA (US)

(73) Assignee: Scrub Daddy, Inc., Folcroft, PA (US)

( * ) Notice: Subject to any disclaimer, the term of this patent is extended or adjusted under 35 U.S.C. 154(b) by 0 days.

(21) Appl. No.: 15/655,264

(22) Filed: Jul. 20, 2017

(51) Int. Cl.
*A47L 25/00* (2006.01)
*B08B 1/00* (2006.01)
*A47L 13/50* (2006.01)
*A45C 11/00* (2006.01)
*A47L 13/00* (2006.01)

(52) U.S. Cl.
CPC .............. *B08B 1/006* (2013.01); *A47L 13/50* (2013.01); *A45C 2011/002* (2013.01); *A47L 13/00* (2013.01); *A47L 25/00* (2013.01)

(58) Field of Classification Search
CPC .......... A47L 25/00; A47L 25/005; G06F 3/039
See application file for complete search history.

(56) References Cited

U.S. PATENT DOCUMENTS 7,431,983 B2 * 10/2008 Amano ................... B32B 5/022
428/292.1
2010/0121300 A1 * 5/2010 Hann ..................... A61F 13/141
604/385.07
2014/0345074 A1 11/2014 Lee

* cited by examiner

*Primary Examiner* — Shay Karls
(74) *Attorney, Agent, or Firm* — Norman E. Lehrer

(57) ABSTRACT

The planar cleaning pad for cleaning the screen of a smart phone or other similar electronic device includes a first surface, an opposed second surface and a periphery encircling the edges of the surfaces. The first surface is made from a microfiber fabric capable of cleaning the screen and the second surface includes a silicone capable of attaching to the back of the phone. The periphery of the pad has a thickness greater than the thickness of the remainder of the pad for ease in removing it from the back of the phone.

8 Claims, 1 Drawing Sheet

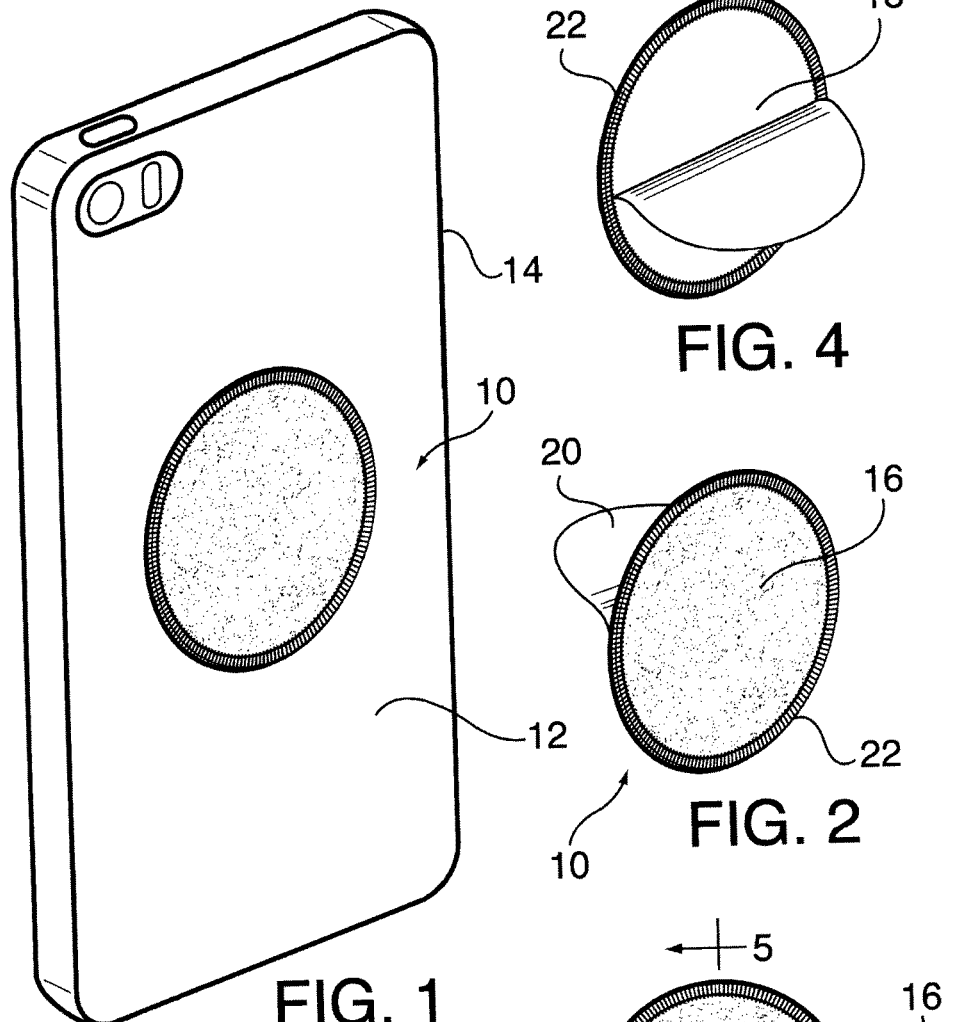

SMART PHONE SCREEN CLEANING PAD

BACKGROUND OF THE INVENTION

The present invention is directed toward an accessory for a smart phone and, more particularly, toward such an accessory in the form of a cleaning pad for cleaning the screen of a smart phone. The screen cleaning pad is adapted to be detachably attached to the rear of the smart phone and can easily be removed whenever it is desired to clean the screen.

Similar screen cleaning pads have previously been known and have been on the market for some time. They are usually circular in shape having a diameter of one to two inches and are carried on the back of the phone. The front surface is comprised of a nonwoven microfiber fabric that cleans the screen when it is rubbed over the same. The back surface includes a polymer adhesive that releasably attaches the pad to the back of the phone. Such prior art cleaning pads are described, for example, in U.S. Published Patent Application No. 2014/0345074, the entire contents of which are incorporated herein by reference.

The cleaning pads of the prior art and as described in the above published application are intended to be used over and over again. It is removed from the back of the phone by prying the same up with one's finger. The screen is cleaned and the pad is replaced on the back of the phone. If the front or rear surface of the pad becomes dirty so that it does not clean well or does not stick well, the entire pad can be cleaned and refreshed with soap and water.

Because the prior art pads can be used over and over again, it has been found that the edges become worn. They sometimes begin to fray and also become thin thereby making it difficult to remove the pad from the phone. This obviously reduces the life of the pad. There is, therefore, a need for a pad that does not suffer from these deficiencies and that can last much longer than previous pads.

SUMMARY OF THE INVENTION

The present invention is designed to overcome the deficiencies of the prior art discussed above. It is an object of the present invention to provide a smart phone screen cleaning pad that functions in a manner similar to prior art pads but which outlasts all known prior art pads.

In accordance with the illustrative embodiment demonstrating features and advantages of the present invention, there is provided a planar cleaning pad for cleaning the screen of a smart phone or other similar electronic device which includes a first surface, an opposed second surface and a periphery encircling the edges of the surfaces. The first surface is made from a microfiber fabric capable of cleaning the screen and the second surface includes a silicone gel material capable of attaching to the back of the phone. The periphery of the pad has a thickness greater than the thickness of the remainder of the pad for ease in removing it from the back of the phone. Alternatively, the peripheral edge could be thinner or the same thickness but lack the silicone gel so that it does not stick to the phone.

Other objects, features, and advantages of the invention will be readily apparent from the following detailed description of the preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of a smart phone screen cleaning pad showing my invention and attached to the rear of a smart phone;

FIG. 2 is a view similar to FIG. 1 but showing the cleaning pad before it is attached to a smart phone;

FIG. 3 is a front elevational view of the cleaning pad;

FIG. 4 is a rear elevational view, and

FIG. 5 is a cross-sectional view taken through the line 5-5 of FIG. 3.

DETAILED DESCRIPTION OF THE PREFERRED EMBODIMENT

Referring now to the drawings in detail wherein like reference numerals have been used throughout the various figures to designate like elements, there is shown in FIGS. 1-5 a smart phone screen cleaning pad constructed in accordance with the principles of the present invention and designated generally as 10. The pad 10 is shown in FIG. 1 attached to the rear surface 12 of a smart phone 14.

The cleaning pad 10 is planar but flexible and includes a first or front surface 16, an opposed second or rear surface 18 and a periphery 22 encircling the outer edges of the front and rear surfaces. Although the pad 10 is shown as round, this is by way of example only. As should be readily apparent to those skilled in the art, the pad could be made in substantially any shape. In the preferred embodiment of the invention, the pad 10 has a diameter of between one and two inches. The only limitation on the size of the pad is that it should not be too large to fit on the back 12 of a smart phone 14.

The front surface 16 of the pad 10 is comprised preferably of a microfiber fabric capable of cleaning the screen of the smart phone 14 when rubbed across the screen (not shown). Such materials are well known in the art. Other similar materials that function in the same way could also be used.

The second or rear surface 18 is comprised of an adhesive material that is bonded to the front surface 16. The adhesive material is preferably a polymer and preferably a silicone gel. Such materials are capable of being attached to and removed from the back of the smart phone many times without losing its stickiness. Should, however, the silicone gel lose it stickiness or the fabric become dirty, they both can be easily cleaned with soap and water.

When initially supplied, and prior to use, the surface 18 is preferably covered with a release paper 20 to protect the same. The paper 20 is removed and discarded, thereby exposing the adhesive.

In order to assist the user in removing the pad 10 from the rear 12 of the smart phone 14 when it is in place, the periphery 22 may have a thickness greater than the thickness of the remainder of said pad. This makes it easier for a person to get his or her finger under the pad to remove the same. In the preferred embodiment of the invention, the greater thickness is created by stitching around the periphery in a manner similar to how fabric patches are prepared that are adapted to be sewn onto clothing. The stitching also protects the periphery of the pad from fraying. In addition, the stitching provides a non-adhesive outer edge around the adhesive 18 to make it easier to remove the pad 10 from the back 12 of the phone 14.

While stitching is the preferred embodiment, it should be obvious that other means may be employed to increase the thickness of the periphery and/or provide a non-adhesive outer edge. Furthermore, it is not beyond the scope of the invention to make the periphery the same thickness or even thinner than the remainder of the pad as long as there is no adhesive at the periphery so that the pad can be easily removed.

The present invention may be embodied in other specific forms without departing from the spirit or essential attributes thereof and accordingly, reference should be made to the appended claims rather than to the foregoing specification as indicating the scope of the invention.

We claim:

1. A cleaning pad for cleaning the screen of a smart phone or other similar electronic device comprising:
   a substantially planar pad having a first surface, an opposed second surface and a periphery encircling the edges of said surfaces;
   said first surface being comprised of a microfiber fabric capable of cleaning the screen of a smart phone when rubbed across the screen;
   said second surface being comprised of an adhesive material bonded to said first surface and being capable of being attached to and removed from the back of said smart phone, and
   said periphery having a thickness greater than the thickness of the remainder of said pad.

2. The cleaning pad for cleaning the screen of a smart phone or other similar electronic device as claimed in claim 1 wherein said second surface is comprised of a polymer adhesive.

3. The cleaning pad for cleaning the screen of a smart phone or other similar electronic device as claimed in claim 2 wherein said second surface is comprised of silicone.

4. The cleaning pad for cleaning the screen of a smart phone or other similar electronic device as claimed in claim 1 wherein said greater thickness is formed from stitching around the periphery of said pad.

5. A cleaning pad for cleaning the screen of a smart phone or other similar electronic device comprising:
   a substantially planar pad having a first surface, an opposed second surface and a periphery encircling the edges of said surfaces;
   said first surface being comprised of a microfiber fabric capable of cleaning the screen of a smart phone when rubbed across the screen, and
   said second surface being comprised of an adhesive material bonded to said first surface and being capable of being attached to and removed from the back of said smart phone throughout substantially said entire second surface except for said periphery and wherein said periphery has a thickness greater than the thickness of the remainder of said pad.

6. The cleaning pad for cleaning the screen of a smart phone or other similar electronic device as claimed in claim 5 wherein said second surface is comprised of a polymer adhesive.

7. The cleaning pad for cleaning the screen of a smart phone or other similar electronic device as claimed in claim 6 wherein said second surface is comprised of silicone.

8. The cleaning pad for cleaning the screen of a smart phone or other similar electronic device as claimed in claim 5 wherein said greater thickness is formed from stitching around the periphery of said pad.

* * * * *